Figure 1:
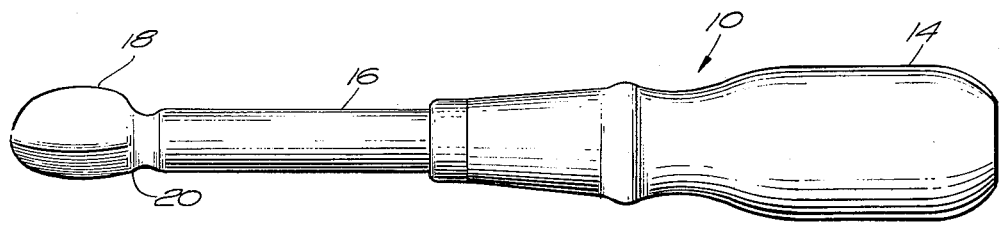

Oct. 26, 1965  R. C. KLOACK  3,213,719

ROTARY DRIVING TOOL WITH UNIVERSAL ACTION

Filed Nov. 1, 1962

*INVENTOR.*
ROBERT C. KLOACK
BY  *Morse & Altman*
ATTORNEYS

# United States Patent Office 3,213,719
Patented Oct. 26, 1965

3,213,719
ROTARY DRIVING TOOL WITH
UNIVERSAL ACTION
Robert C. Kloack, 34 Coolidge St., Revere, Mass.
Filed Nov. 1, 1962, Ser. No. 234,718
1 Claim. (Cl. 81—71)

This invention relates generally to universal joints and more particularly is directed towards a new and improved hand tool for driving threaded connectors such as screws, bolts and the like characterized by a novel connecting arrangement which permits a universal driving action.

When driving screws, bolts and so forth in locations that are difficult to reach or which may be in a corner or some other such area where it is awkward, if not impossible, to line up the driving tool coaxially with the screw or bolt, it is usually necessary to employ an offset ratchet or some other type of special tool to turn the screw. Quite frequently the slot in the screwhead will be stripped by attempting to drive the screw from an angle rather than from an aligned position. This will result in further delay since the screw will have to be removed and replaced to complete the connection.

In any event, the task of setting the threaded connectors into a relatively inaccessible area heretofore has been a frustrating and time-consuming task. While various tools may be employed to drive screws and bolts, none of them is entirely satisfactory for various reasons. For example, the conventional screwdriver with a straight tip frequently strips the head of a conventional slotted screw. The same is true of the Phillips head screw and screwdriver. In addition, both of these tools must be substantially aligned with the axis of the screw in order to function. Offset ratchets which are sometimes employed to drive standard bolts are also limited to operate at only one angle with respect to the driven bolt. Although there are numerous universal couplings available, these are all relatively expensive and are made from several different parts that are hinged together in such a manner as to provide the desired universal action.

It is an object of the present invention to provide improvements in universal couplings for applying torque from one axially rotatable element to another rotatable element whose axis may or may not be offset from that of the driving element.

Another object of this invention is to provide a universal coupling in which the driving and driven elements are both of rigid one piece construction.

A more particular object of this invention is to provide an improved screw and screwdriver in which the screwdriver may function effectively from various angles with respect to the axis of the screw.

Still another object of this invention is to provide a one-piece screw and a one-piece screwdriver connectable for a universal driving action.

Yet another object of this invention is to provide an improved screw and screwdriver in which the screwhead is not susceptible to stripping and in which the screwdriver is not susceptible to accidental disengagement.

More particularly, this invention features a two-piece universal coupling arrangement in which the driven element may be a screw or bolt and the driving element may be a screwdriver or other similar tool. According to the invention, either the driving or the driven element is formed with a relatively deep socket of equilateral triangular cross-section adapted to receive the end of the other element which is dimensioned to fit within the socket and is formed in cross-section with three slightly convex sides each of which tapers to a blunt tip. Each face of the head portion is slightly curved in profile as well as in cross-section in such a manner that the axes of the elements may be rotated through various angular positions with respect to one another without in any way impairing driving connection. In the preferred embodiment of the invention, the screwdriver is formed with a head portion having a cross-section which defines a somewhat distended equilateral triangle having curvilinear sides. The screw, on the other hand, is formed with a flat-walled socket having a cross-section of an equilateral triangle with straight sides and dimensioned to accommodate the head portion. The head portion is characterized by slightly convex faces which terminate in a tip whereby the screwdriver may connect in driving engagement with the screw and be rotated about an axis that is at any chosen angle with respect to the axis of the screw and within the range of alignment.

Figure 2:
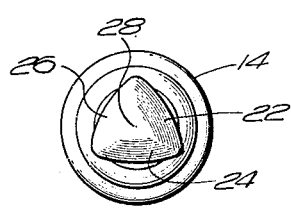
Figure 3:
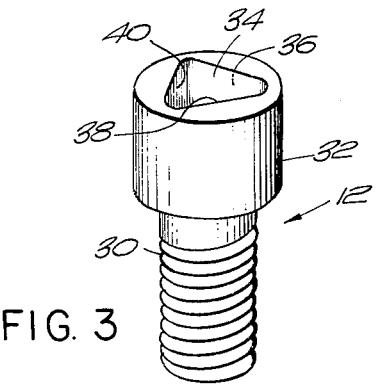
Figure 4:
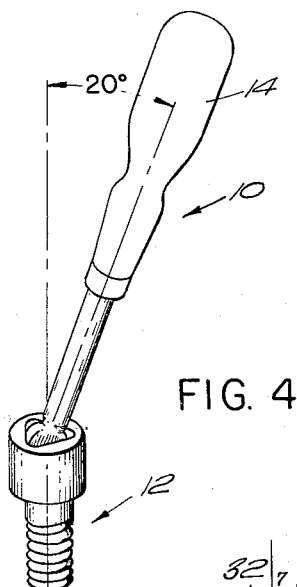
Figure 6:
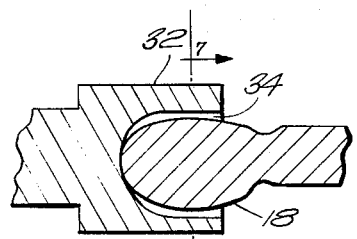
Figure 5:
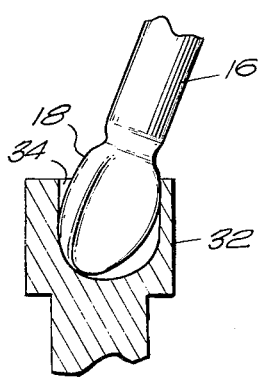
Figure 7:
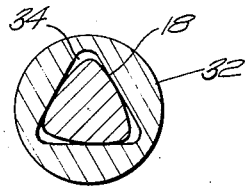

But, these and other features of the invention, along with further objects and advantages thereof, will become more fully apparent from the following detailed description of the invention with reference being made to the accompanying drawings in which;

FIG. 1 is a view in side elevation of a screwdriver made according to the invention, FIG. 2 is in end elevation thereof, FIG. 3 is a perspective view of a screw made according to the invention, FIG. 4 is a perspective of the screwdriver assembled in driving engagement with the screw, FIG. 5 is a fragmentary view in side elevation of the two components in assembled angular relation with the driven member being shown in cross-section, FIG. 6 is a view similar to FIG. 5 but showing the tool elements in axial alignment, and, FIG. 7 is a cross-section taken along the line 7—7 of FIG. 6.

Referring now to the drawings, the reference character 10 generally indicates a screwdriver and the reference character 12 generally indicates a bolt or screw. The screwdriver 10 is provided with a conventional handle 14 of wood, plastic, metal or the like mounted at the end of an elongated shank 16 typically of hardened steel, or the like.

At the tip of the shank 16 there is formed a head 18 which is connected integrally with the shank 16 through a reduced neck portion 20. The head 18 has a symmetrical configuration characterized by cross-section which generally defines an equilateral triangle with curvilinear sides as best shown in FIGS. 2 and 7. The head 18 is thus formed with three driving faces 22, 24 and 26 which are slightly convex both laterally and longitudinally and taper towards one another to meet at a relatively blunt tip 28. The faces will be seen to curve rearwardly and merge smoothly with the reduced neck portion 20.

The screw 12 is formed with a conventional threaded shank 30 and an enlarged head 32. The head 32 is characterized by an axial recess or socket 34 having three flat side walls 36, 38 and 40 defining an equilateral triangle in cross-section. Preferably, the apices of the socket are slightly rounded to add strength to the head and reduce the chance of the head splitting along these junctures. The socket is dimensioned to accommodate the head portion 18 in cooperating driving engagement when the screwdriver 10 is inserted therein as suggested in FIGS. 4, 5 and 6. The socket 34 is sufficiently deep so that the head 18 may be inserted up to the reduced neck 20.

It will be appreciated that the geometry of the head 18 and the socket 34 is such that the longitudinal axis of either member may be angularly oriented with respect to the axis of the other member and still maintain driving engagement. This feature is best shown in FIG. 4 where the screwdriver extends angularly with respect to the axis of rotation of the screw 12. It will be understood that the screwdriver 10 is able to be rotated about its longitudinal axis from this position or from any position within the range of adjustment. Typically, the screwdriver may be operated within a range of 40° or so with respect to the longitudinal axis of the screw.

As illustrated in FIGS. 5 and 6 the driving faces 22, 24 and 26 of the head 18 retain a three point contact with the flat walls 36, 38 and 40 of the socket 34 despite angular changes of the screwdriver with respect to the axis of the driven screw. Each driving face of the head is a cam surface which furnishes the continuous three-point triangular contact with the socket walls through the various angles of drive.

Referring now more particularly to FIGS. 5, 6 and 7, it will be seen that when the head 18 is inserted in the socket 34 there is very little play between the walls of the socket and the opposing cam faces of the head. As best shown in FIG. 7 the semi-triangular cross-section of the head mates with the triangular cross-section of the socket and the dimensions are such as to provide positive driving engagement with no possibility of the head 18 turning within the socket. By curving the faces of the head in the manner shown and described, it is possible to rotate the screwdriver about its longitudinal axis various angles of connection in much the same fashion as a conventional universal joint but without the usual loose action normally associated with such joints. This feature is particularly advantageous where the screw must be applied in an awkward or relatively inaccessible location. For example, it is well known that it is difficult to drive in a screw that is immediately adjacent one wall in a corner. Now however by employing a screw and screwdriver of the type illustrated herein, complete and forceful driving action may be applied to the screw from a number of convenient angles. This permits the screw to be driven in locations which heretofore would have been difficult or impossible to attain with the conventional tools. Obviously, the screwdriver will function in a perfectly efficient manner when aligned axially with the screw as well as when angularly offset therefrom.

While the invention has been described herein with particular reference to the illustrated embodiment, it will be understood that numerous modifications thereto will appear to those skilled in the art without departing from the invention. For example, the screw may be provided with a solid head having a configuration similar to that of the head 18 and the screwdriver may in turn be provided with a socket for connection with the head. While the number of opposing and cooperating faces may be increased over that shown and described, it is believed that the triangular configuration for both parts provides optimum performance. Also, the coupling arrangement may be employed in various other situations normally employing a universal joint. It will be appreciated that the coupling provided by this invention may be produced at a much lower cost than the conventional universal couplings which require a number of different parts hinged for angular movement with respect to one another. According to this invention the driving and driven member are both of one piece construction which may be readily manufactured by conventional machines. Obviously, the driving member may be connected to a power drive for use in assembly line operations or the like. Also a flexible shaft may be employed between the head and the driving handle or motor whichever is employed. For further convenience, the shank and head of the screwdriver may be permanently magnetized so that magnetically attractive screws may be preassembled over the head for reaching to remote locations.

Accordingly, the above description and accompanying drawings should be taken as illustrative of the invention and not in a limiting sense.

Having thus described the invention, what I claim and desire to obtain by Letters Patent of the United States is:

In a driver for use with a driven member in which is formed an axial socket, the combination comprising: a driver shank portion and a driver head portion, said head portion having a cross sectional configuration of a distended equilateral triangle defining transversely curving side faces, said head portion being dimensioned for mating three point contact and driving engagement with said driven member when said driver head is inserted in said socket, each side face of said head portion defining a working surface curving transversely and longitudinally and terminating at the free end thereof in a generally pointed tip, whereby said driven member and said driver may be interconnected in driving relation and rotated about angularly independent axes.

References Cited by the Examiner
UNITED STATES PATENTS 218,278   8/79   Kimball.

FOREIGN PATENTS 548,615   10/42   Great Britain.
876,781   9/61   Great Britain.

WILLIAM FELDMAN, *Primary Examiner.*